United States Patent
Martini et al.

(10) Patent No.: US 12,258,039 B2
(45) Date of Patent: Mar. 25, 2025

(54) METHOD OF DETERMINING A CONTINUOUS DRIVING PATH IN THE ABSENCE OF A NAVIGATIONAL ROUTE FOR AUTONOMOUS VEHICLES

(71) Applicant: GM GLOBAL TECHNOLOGY OPERATIONS LLC, Detroit, MI (US)

(72) Inventors: Ryan D. Martini, Wolverine Lake, MI (US); Constandi John Shami, Ann Arbor, MI (US); Benjamin L. Williams, Milford, MI (US); Crystal J. Nassouri, Waterford, MI (US); Nolan Foster, Berkley, MI (US); Morgan Douglas Dykshorn, Oak Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 300 days.

(21) Appl. No.: 17/810,764

(22) Filed: Jul. 5, 2022

(65) Prior Publication Data

US 2024/0010230 A1 Jan. 11, 2024

(51) Int. Cl.
*B60W 60/00* (2020.01)
*B60W 40/08* (2012.01)
*B60W 50/00* (2006.01)

(52) U.S. Cl.
CPC ........ *B60W 60/0011* (2020.02); *B60W 40/08* (2013.01); *B60W 50/0098* (2013.01); *B60W 60/0053* (2020.02); *B60W 60/0057* (2020.02); *B60W 2050/0005* (2013.01); *B60W 2050/0083* (2013.01); *B60W 2540/215* (2020.02); *B60W 2556/40* (2020.02)

(58) Field of Classification Search
CPC .... G05D 1/0061; G05D 1/0221; G05D 1/639; B60W 60/001; B60W 60/0013; B60W 60/0018; B60W 60/005; B60W 60/0053; B60W 60/0055; B60W 50/14; B60W 60/0011
See application file for complete search history.

(56) References Cited

U.S. PATENT DOCUMENTS

| 2012/0173067 A1* | 7/2012 | Szczerba | G06F 3/0412 701/1 |
| 2015/0166069 A1* | 6/2015 | Engelman | B60W 30/12 701/23 |

(Continued)

*Primary Examiner* — David A Testardi
(74) *Attorney, Agent, or Firm* — Lorenz & Kopf LLP

(57) ABSTRACT

Methods and systems for determining a continuous driving path for a vehicle include: (i) automatically controlling movement of the vehicle along a path while prioritizing the movement so as to minimize vehicle maneuvers, via a processor; (ii) obtaining data including location information as to a location of the vehicle and map information pertaining to the location as the vehicle is travelling autonomously via by the processor; (iii) determining, via the processor, when a decision is needed with respect to further travel of the vehicle, based on the location information and the map information; (iv) requesting, via the processor, driver input as to a driver preference of a driver for movement of the vehicle with regard to the decision; (v) receiving, via one or more sensors, the driver input including the driver preference; and (vi) determining, via the processor, the continuous driving path based on the driver preference.

15 Claims, 2 Drawing Sheets

(56) References Cited

U.S. PATENT DOCUMENTS

| | | | |
|---|---|---|---|
| 2016/0161267 A1* | 6/2016 | Harada | G01C 21/3658 |
| | | | 701/25 |
| 2016/0356623 A1* | 12/2016 | Matsumoto | G01C 21/3461 |
| 2017/0151958 A1* | 6/2017 | Sakuma | B60W 50/10 |
| 2017/0248957 A1* | 8/2017 | Delp | B60W 10/20 |
| 2017/0261987 A1* | 9/2017 | Takahashi | G05D 1/0088 |
| 2017/0297588 A1* | 10/2017 | Doshi | G06F 21/32 |
| 2017/0361853 A1* | 12/2017 | Nagy | B60W 10/20 |
| 2018/0029610 A1* | 2/2018 | McNew | B60W 50/0097 |
| 2018/0074497 A1* | 3/2018 | Tsuji | B60W 60/0027 |
| 2018/0105185 A1* | 4/2018 | Watanabe | B60K 35/10 |
| 2018/0203455 A1* | 7/2018 | Cronin | G01C 21/3461 |
| 2018/0252545 A1* | 9/2018 | Laur | G01C 21/3694 |
| 2018/0281796 A1* | 10/2018 | Ravichandran | B60W 30/181 |
| 2018/0281817 A1* | 10/2018 | Ravichandran | B60K 35/10 |
| 2018/0281818 A1* | 10/2018 | Ebina | G08G 1/01 |
| 2018/0290665 A1* | 10/2018 | Hu | B60W 50/06 |
| 2018/0292829 A1* | 10/2018 | Li | G06Q 10/02 |
| 2018/0336007 A1* | 11/2018 | Li | G10L 15/22 |
| 2019/0126942 A1* | 5/2019 | Goto | B60W 40/08 |
| 2019/0248382 A1* | 8/2019 | Hashimoto | B60W 60/0053 |
| 2019/0266889 A1* | 8/2019 | Suzuki | G08G 1/0112 |
| 2019/0310633 A1* | 10/2019 | Toyoda | B60W 50/085 |
| 2020/0026284 A1* | 1/2020 | Hiramatsu | G08G 1/0125 |
| 2020/0086887 A1* | 3/2020 | Gohl | B60W 30/08 |
| 2020/0094838 A1* | 3/2020 | Nishimura | G05D 1/0061 |
| 2020/0192351 A1* | 6/2020 | Rastoll | G05D 1/0038 |
| 2020/0225675 A1* | 7/2020 | Lacaze | G05D 1/0278 |
| 2020/0269864 A1* | 8/2020 | Zhang | G08G 1/165 |
| 2020/0319644 A1* | 10/2020 | Li | B60W 60/001 |
| 2020/0346665 A1* | 11/2020 | Araújo et al. | A61B 5/163 |
| 2021/0009117 A1* | 1/2021 | Emura | B60Q 5/006 |
| 2021/0063178 A1* | 3/2021 | Modi | G01C 21/3667 |
| 2021/0094571 A1* | 4/2021 | Yu | G01C 21/3691 |
| 2021/0347376 A1* | 11/2021 | Klesing | B60W 60/001 |
| 2022/0001878 A1* | 1/2022 | Sano | B60W 40/09 |
| 2022/0073097 A1* | 3/2022 | Sucan | G05D 1/0022 |
| 2022/0081007 A1* | 3/2022 | Liu | G06Q 10/047 |
| 2022/0204028 A1* | 6/2022 | Xu | B60W 60/005 |
| 2023/0192149 A1* | 6/2023 | Uchiyama | B60W 60/0053 |
| | | | 701/23 |
| 2023/0347888 A1* | 11/2023 | Ueno | B60W 50/0098 |

\* cited by examiner

METHOD OF DETERMINING A CONTINUOUS DRIVING PATH IN THE ABSENCE OF A NAVIGATIONAL ROUTE FOR AUTONOMOUS VEHICLES

TECHNICAL FIELD

The technical field generally relates to vehicles, and more particularly relates to methods and systems for determining a continuous driving path under circumstances in which a navigational route is unavailable, for vehicles with autonomous functionality.

Certain vehicles today have autonomous functionality, for example in which the vehicle is operated autonomously in some or all circumstances. However, existing techniques may not always provide for providing autonomous driving in situations in which a navigational route is unavailable.

Accordingly, it may be desirable to provide improved methods and systems for providing a continuous driving path for a vehicle with autonomous functionality in the absence of a navigational route. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided for determining a continuous driving path for a vehicle, the method including: (i) automatically controlling movement of the vehicle along a path while prioritizing the movement so as to minimize vehicle maneuvers, in accordance with instructions provided via a processor; (ii) obtaining data including location information as to a location of the vehicle and map information pertaining to the location as the vehicle is travelling autonomously in accordance with instructions provided by the processor; (iii) determining, via the processor, when a decision is needed with respect to further travel of the vehicle, based on the location information and the map information; (iv) requesting, via instructions provided by the processor, driver input as to a driver preference of a driver for movement of the vehicle with regard to the decision; (v) receiving, via one or more sensors, the driver input including the driver preference; and (vi) determining, via the processor, the continuous driving path based on the driver preference.

Also in an exemplary embodiment, the method further includes automatically moving the vehicle along the continuous driving path, via instructions provided by the processor.

Also in an exemplary embodiment: the step of automatically moving the vehicle along the continuous driving path includes automatically moving the vehicle along the continuous driving path, via instructions provided by the processor, upon a further condition that the driver input is received within a predetermined amount of time; and the method further includes returning control of vehicle movement to the driver, rather via automatic vehicle control, when the driver input is not received within the predetermined amount of time.

Also in an exemplary embodiment, the step of receiving the driver input includes receiving, via the one or more sensors, the driver input from a turn indicator of the vehicle.

Also in an exemplary embodiment, the method further includes storing the driver input for further use in autonomous movement of the vehicle.

Also in an exemplary embodiment, the method further includes storing the driver input for further use in autonomous movement of one or more other vehicles.

Also in an exemplary embodiment, the step of determining when the decision is needed includes determining, via the processor, when the decision is needed with respect to further travel of the vehicle a level of probability for a particular solution exceeds a predetermined threshold with respect to certainty that the driver would be deemed to prefer the particular solution for the decision.

In another exemplary embodiment, a system for determining a continuous driving path for a vehicle is provided, the system including: (a) a processor configured to at least facilitate: (i) automatically controlling movement of the vehicle along a path while prioritizing the movement so as to minimize vehicle maneuvers, in accordance with instructions provided via a processor; (ii) obtaining data including location information as to a location of the vehicle and map information pertaining to the location as the vehicle is travelling autonomously in accordance with instructions provided by the processor; (iii) determining when a decision is needed with respect to further travel of the vehicle, based on the location information and the map information; (iv) requesting, via instructions provided by the processor, driver input from a driver as to a driver preference for movement of the vehicle with regard to the decision; and (b) one or more sensors coupled to the processor and configured to at least facilitate receiving the driver input including the driver preference; wherein the processor is further configured to at least facilitate (v) determining the continuous driving path based on the driver preference.

Also in an exemplary embodiment, the processor is further configured to at least facilitate automatically moving the vehicle along the continuous driving path, via instructions provided by the processor.

Also in an exemplary embodiment, the processor is further configured to at least facilitate: automatically moving the vehicle along the continuous driving path, via instructions provided by the processor, upon a further condition that the driver input is received within a predetermined amount of time; and returning control of vehicle movement to the driver, rather via automatic vehicle control, when the driver input is not received within the predetermined amount of time.

Also in an exemplary embodiment, the one or more sensors are further configured to receive the driver input from a turn indicator of the vehicle.

Also in an exemplary embodiment, the processor is further configured to at least facilitate storing the driver input in computer memory for further use in autonomous movement of the vehicle.

Also in an exemplary embodiment, the processor is further configured to at least facilitate storing the driver input for further use in autonomous movement of one or more other vehicles.

Also in an exemplary embodiment, the processor is further configured to at least facilitate determining when the decision is needed with respect to further travel of the vehicle a level of probability for a particular solution exceeds a predetermined threshold with respect to certainty that the driver would be deemed to prefer the particular solution for the decision.

In another exemplary embodiment, a vehicle is provided that includes: (a) a body; (b) a location system configured to generate location information as to a location of the vehicle; (c) a computer memory configured to store map information as to the location; (d) a processor configured to at least facilitate: (i) automatically controlling movement of the vehicle along a path while prioritizing the movement so as to minimize vehicle maneuvers, in accordance with instructions provided via the processor; (ii) determining when a decision is needed with respect to further travel of the vehicle, based on the location information and the map information; and (iii) requesting, via instructions provided by the processor, driver input from a driver as to a driver preference for movement of the vehicle with regard to the decision; and (e) one or more sensors coupled to the processor and configured to at least facilitate receiving the driver input including the driver preference; wherein the processor is further configured to at least facilitate (iv) determining a continuous driving path based on the driver preference.

Also in an exemplary embodiment, the processor is further configured to at least facilitate automatically moving the vehicle along the continuous driving path, via instructions provided by the processor.

Also in an exemplary embodiment, the processor is further configured to at least facilitate: automatically moving the vehicle along the continuous driving path, via instructions provided by the processor, upon a further condition that the driver input is received within a predetermined amount of time; and returning control of vehicle movement to the driver, rather via automatic vehicle control, when the driver input is not received within the predetermined amount of time.

Also in an exemplary embodiment, the one or more sensors are further configured to receive the driver input from a turn indicator of the vehicle.

Also in an exemplary embodiment, the processor is further configured to at least facilitate storing the driver input in the computer memory for further use in autonomous movement of the vehicle and for further use in autonomous movement of one or more other vehicles.

Also in an exemplary embodiment, the processor is further configured to at least facilitate determining when the decision is needed with respect to further travel of the vehicle a level of probability for a particular solution exceeds a predetermined threshold with respect to certainty that the driver would be deemed to prefer the particular solution for the decision.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
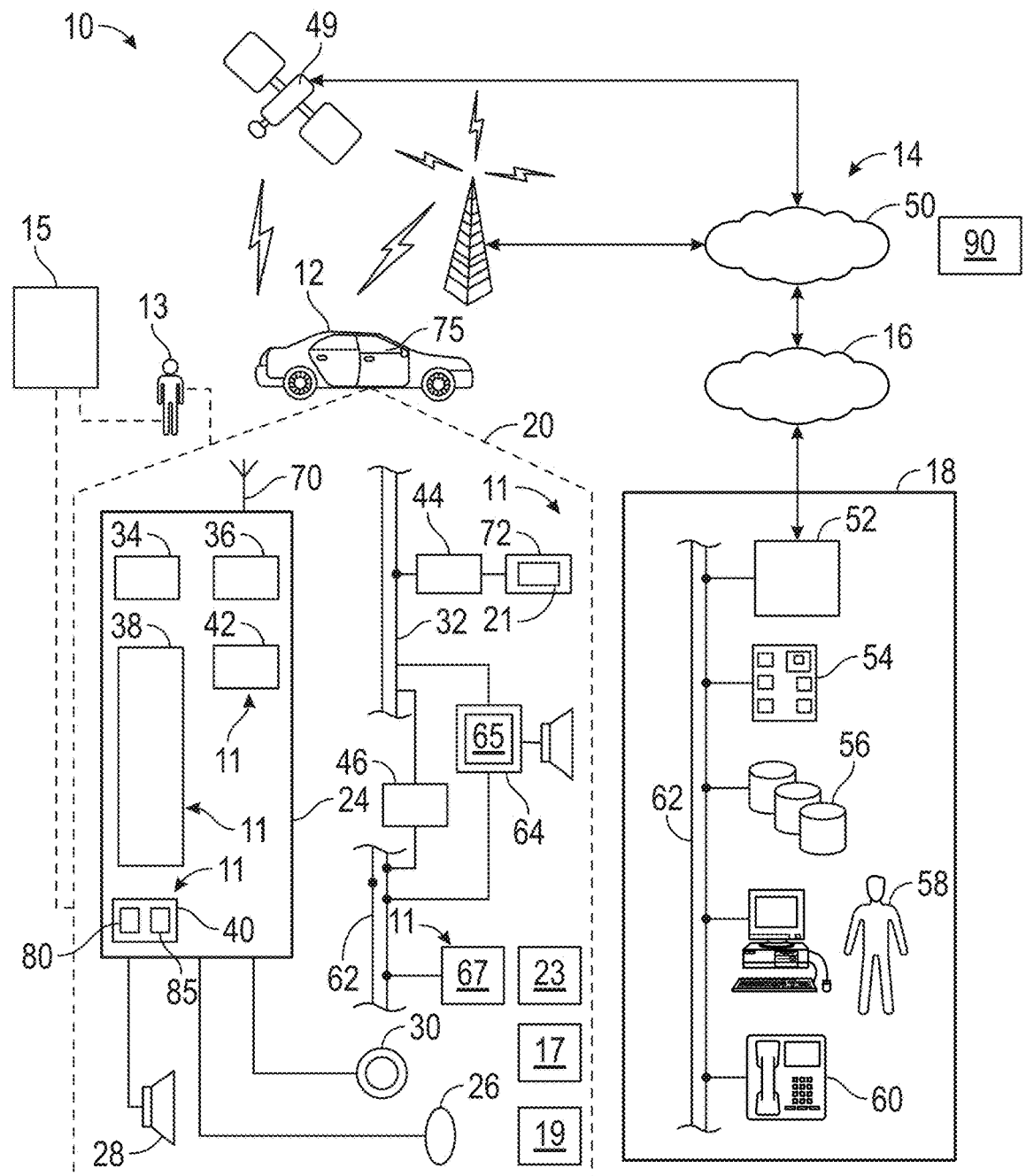
FIG. 1 is a functional block diagram of a communications system that includes a vehicle having autonomous functionality and having a control system that is configured to control the autonomous functionality, including for determining and implementing a continuous driving path for the vehicle in the absence of a navigational route.

FIG. 1 is a functional block diagram of a communications system 10, in accordance with an exemplary embodiment. As described in greater detail further below, the communications system 10 includes a vehicle 12 (also referred to herein as the "host vehicle") that includes a control system 11 that is configured to determine and implement a continuous driving path for the vehicle in the absence of a navigational route, pursuant to the process 200 described further below in connection with FIG. 2, in accordance with an exemplary embodiment.

As described further below, in various embodiments, the control system 11 includes a processor 38, a computer memory 40, vehicle sensors 72, and one or more displays 67. In certain embodiments, the control system may also include a satellite-based location determining system component (e.g., GPS) 42, among various other components.

In certain embodiments, the vehicle 12 comprises a semi-autonomous vehicle 12 with automated control over certain vehicle functionality via the control system 11, for example including automated control of a vehicle powertrain 17, braking system 23, and/or steering system 19, among other possible vehicle systems. In certain embodiments, the vehicle 12 may comprise a fully autonomous vehicle.

As depicted in FIG. 1, in certain embodiments, a user (e.g., a driver) 13 also has a device 15, such as a smart phone, computer, and/or other electronic device 15, for example that may communicate with both the user (e.g., the driver) 13 and the vehicle 12.

As depicted in FIG. 1, the communications system 10 generally includes the vehicle 12, along with one or more wireless carrier systems 14, one or more land networks 16, and one or more remote servers 18. In various embodiments, the communications system 10 may also include one or more other vehicles 90 (e.g., a fleet of vehicles). In various embodiments, user (e.g., driver) preferences of the vehicle 12 may also be aggregated with user (e.g., driver) preferences of the other vehicles 90 for improved for improved decision making for travel of the various vehicles 12, 90, including situations in which a decision as to travel thereof may otherwise be indeterminate (e.g., when there is an upcoming intersection or t-junction, and/or in which a current lane merges or branches off into multiple different lanes, and so on).

It should be appreciated that the overall architecture, setup, and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

The vehicle 12 may be any type of mobile vehicle such as a motorcycle, car, truck, recreational vehicle (RV), boat, plane, farm equipment, or the like, and is equipped with suitable hardware and software that enables it to communicate over communications system 10. As shown in FIG. 1, in various embodiments the vehicle hardware 20 is disposed within a body 75 of the vehicle 12, and includes a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the remote server 18, and generally includes an electronic processing device (processor) 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

In various embodiments, the processor 38 provides processing functionality for the vehicle 12, including autonomous functionality thereof. In various embodiment, the processor 38 is configured to determine and implement a continuous driving path for the vehicle 12 in the absence of a navigational route, pursuant to the process 200 described further below in connection with FIG. 2.

In various embodiments, the processor 38 determines and implements the continuous driving path utilizing preferences from the driver 13 that are obtained via driver inputs as to the driver 13's preferences with respect to travel options for the vehicle 12 during situations in which an automated decision would otherwise be indeterminable (e.g., including situations in which there is an upcoming intersection or t-junction, and/or in which a current lane merges or branches off into multiple different lanes, and so on).

In various embodiments, embodiments, the memory 40 stores the driver preferences as preference data 85. In addition, in various embodiments, the memory 40 also stores map data 80, including for a roadway on which the vehicle 12 is travelling.

In various embodiments, the telematics unit 24 can be an embedded/installed within the vehicle 12 at the time of manufacture, or may be an aftermarket unit that is installed after manufacture of the vehicle 12. In various embodiments, the telematics unit 24 enables voice and/or data communications over one or more wireless networks (e.g., wireless carrier system 14), and/or via wireless networking, thereby allowing communications with the remote server 18 and/or other vehicles and/or systems.

In various embodiments, the telematics unit 24 may use radio transmissions to establish a voice and/or data channel with the wireless carrier system 14 so that both voice and data transmissions can be sent and received over the voice and/or data channels. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS chipset/component 42 and the cellular chipset/component 34. In various embodiments, the telematics unit 24 utilizes cellular communication according to industry standards, such as LTE, 5G, or the like. In addition, in various embodiments, the telematics unit 24 carries out wireless networking between the vehicle 12 and one or more other network devices, for example using one or more wireless protocols such as one or more IEEE 802.11 protocols, WiMAX, or Bluetooth.

The telematics unit 24 may offer a number of different services for users of the vehicle 12, including determining and implementing a continuous driving path for the vehicle 12 in the absence of a navigational route (e.g., pursuant to the process 200 described further below in connection with FIG. 2), including via the use of inputs from the driver 13 and via automatically controlling one or more vehicle functions (such as the powertrain 17, braking system 23, steering system 19, and/or other vehicle systems), in accordance with an exemplary embodiment.

In addition, in certain embodiments, the telematics unit 24 may also provide connection with electronic devices 15. In various embodiments, the electronic devices may include, by way of example, various consumer electronic/mobile devices, such as a smart phone, a laptop, a smart wearable device, a tablet computer, a network computer, and/or one or more other electronic devices and/or combinations thereof.

In various embodiments, one or more short-range wireless connection (SRWC) protocols (e.g., Bluetooth/Bluetooth Low Energy, or Wi-Fi) may be utilized. In various embodiments, once the SRWC is established, the electronic devices 15 may be become bonded and/or recognized as network participants for the telematics unit 24, for example for current uses as well as in the future. For example, in certain embodiments, when the electronic device 15 is subsequently in wireless range with the telematics unit 24 after the initial pairing, telematics unit 24 (and/or the remote server 18) may confirm that the electronic device 15 is recognized as already being paired or established as a network participant for communicating with the telematics unit 24 and receiving services therefrom.

In addition, in various embodiments, the telematics unit 24 may also provide other services, such as, by way of example: turn-by-turn directions and other navigation-related services provided in conjunction with the GPS chipset/component 42; emergency assistance services, information requests from the users of the vehicle 12 (e.g., regarding points of interest en route while the vehicle 12 is travelling), and/or infotainment-related services, for example in which music, internet web pages, movies, television programs, videogames, and/or other content are downloaded by an infotainment center 46 that may be part of the telematics unit 24 and/or operatively connected to the telematics unit 24 via vehicle bus 32 and audio bus 22, among various other types of possible services.

With respect to other electronic components utilized in connection with the telematics unit 24, the microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and remote server 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with remote server 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22. In various embodiments, the audio component 64 includes radio system 65 (which also includes antenna 70, as well as amplifiers, speakers, and the like, in certain embodiments).

Also in various embodiments, display component 67 provides a visual display for the driver 13 of the vehicle 12. In various embodiments, the display components 67 provides a visual display for the driver 13, for example as to potential routes for travel of the vehicle 12.

Vehicle sensors 72, connected to various sensor interface modules 44 are operatively connected to the vehicle bus 32. In various embodiments, the vehicle sensors 72 include one or more input sensors 21 for receiving inputs from the driver 13.

In various embodiments, the input sensors 21 receive driver inputs as to the driver's preferences with regard to potential options for travel of the vehicle 12, including in situations involving otherwise indeterminable decisions for travel of the vehicle 12 (e.g., including situations in which there is no clear choice among potential options for travel of the vehicle 12, for example including situations in which there is an upcoming intersection or t-junction, and/or in which a current lane merges or branches off into multiple different lanes, and so on). In certain embodiments, the input sensors 21 are coupled to one or more driver input devices, such as part of the display 67, microphone 26, and/or buttons and/or controls 30. It will be appreciated that in various embodiments the driver inputs may be verbal, while in certain other embodiments the driver inputs may be expressed via a driver 13's engagement of a touch screen and/or one or knobs, buttons, turn indicators, steering wheel, or the like. In certain embodiments, user inputs may also be obtained via the device 15 of the driver 13.

In various embodiments, the vehicle sensors 72 may also include any number of different types of sensors including, by way of example, wheel speed sensors, gyroscopes, accelerometers, magnetometers, emission detection, and/or control sensors, and the like. Also in various embodiments, exemplary sensor interface modules 44 include powertrain control, braking control, steering control, climate control, and body control, to name but a few.

In various embodiments, the wireless carrier systems 14 may be any number of cellular telephone systems, satellite-based wireless systems, and/or any other suitable wireless systems, for example that transmits signals between the vehicle hardware 20 and land network 16 (and/or, in certain embodiments, that communicate directly with the vehicle 12 and/or the remote server 18). According to certain examples, wireless carrier system 14 may include and/or be coupled to one or more cell towers 48, satellites 49, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

The land network 16 can be a conventional land-based telecommunications network that is connected to one or more landline telephones, and that connects wireless carrier system 14 to remote server 18. For example, the land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

The remote server 18 is designed to provide the vehicle hardware 20 with a number of different system back-end functions and, according to the example shown here, generally includes one or more switches 52, servers 54 (e.g., including one or more processors), databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing.

The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a remote server 18 that is manned, it will be appreciated that the remote server 18 can be any central or remote facility, manned or unmanned, mobile, or fixed.

Figure 2:
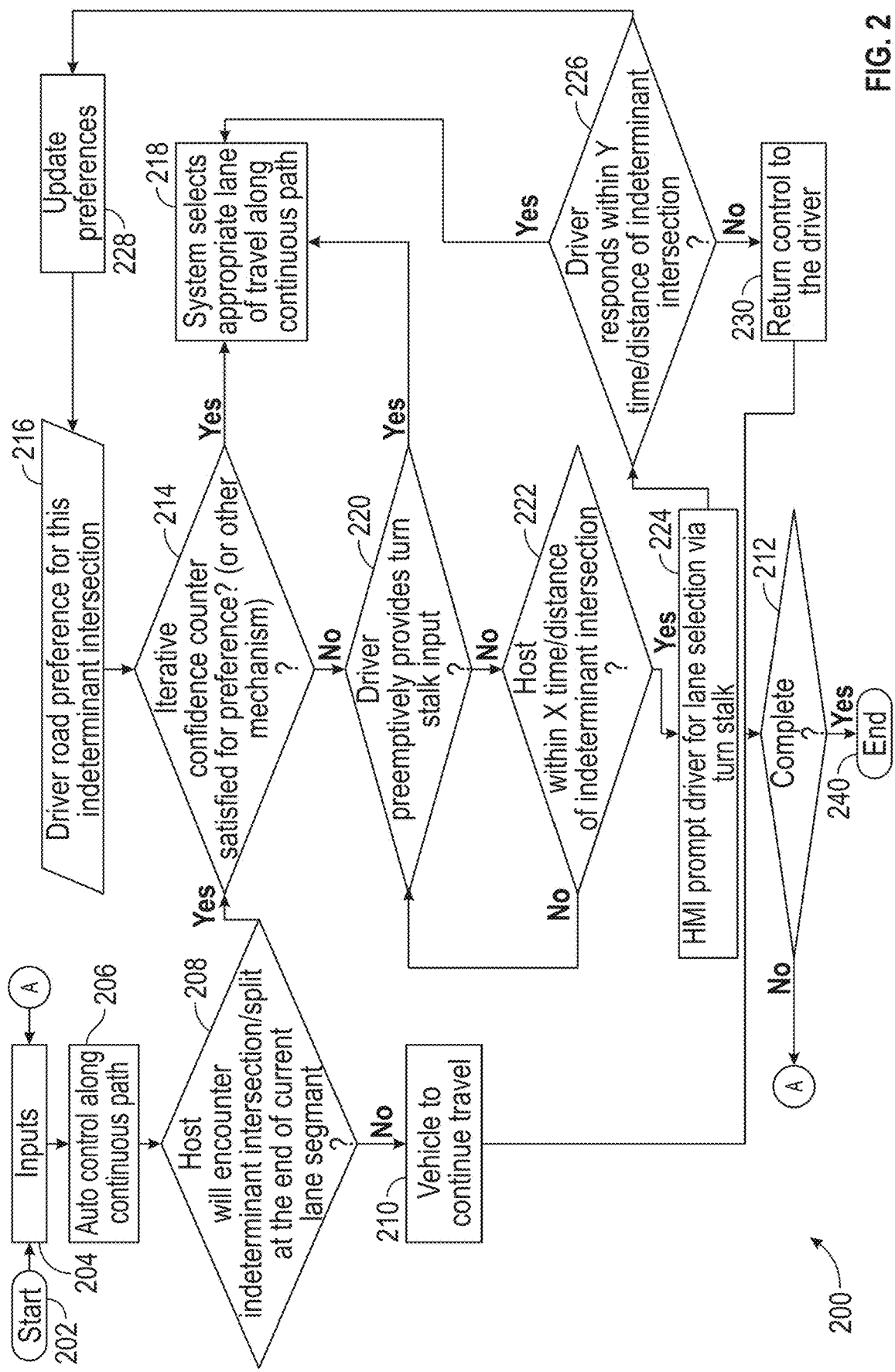
FIG. 2 is a flowchart of a process for determining and implementing a continuous driving path for a vehicle in the absence of a navigational route, and that can be implemented in connection with the communications system of FIG. 1, including the vehicle and control system thereof, in accordance with an exemplary embodiment.

FIG. 2 is a flowchart of a process 200 for determining and implementing a continuous driving path for a vehicle in the absence of a navigational route. In various embodiments, the process 200 can be implemented in connection with the communications system 10 of FIG. 1, including the vehicle 12 and control system 11 thereof, in accordance with an exemplary embodiment.

As depicted in FIG. 2, in an exemplary embodiment, the process 200 begins at step 202. In various embodiments, the process 200 begins when a driver enters the vehicle 12 and/or begins operation of the vehicle 12, and/or when a current vehicle drive and/or ignition cycle begins.

In various embodiments, inputs are received at step 204. In various embodiments, the inputs of step 204 may include initial driver inputs requesting that the control system 11 provide automatic control for vehicle movement. In addition, in certain embodiments, the initial driver inputs may also include an initial location or direction of travel for the vehicle 12. In various embodiments, such initial drier inputs are obtained via one or more input sensors 21 of FIG. 1 and/or via the electronic device 15 of the driver 13. Also in various embodiments, the inputs include vehicle location data, for example as obtained via the navigation (e.g., GPS) system 42 of FIG. 1. In addition, in various embodiments, the inputs also include map data pertaining to the location of the vehicle 12 and surrounding roadways and areas, for example as obtained via the map 80 stored in the memory 40 of FIG. 1 (or, for example, as obtained from the remote server 18 of FIG. 1).

In various embodiments, automatic control is provided for the vehicle (step 206). In various embodiment, a processor (such as the processor 38 of the vehicle 12 and/or a processor of the servers 54 of FIG. 1) automatically controls movement of the vehicle 12 of FIG. 1 in accordance with the inputs of step 204 (for example in accordance with a driver's request for automatic control and/or with respect to a direction or destination of travel for the vehicle 12, as well as using the location data and map data, and so on). Also in various embodiments, the processor provides automatic movement of the vehicle 12 via automatic propulsion, acceleration, steering, braking, and so on in a manner that prioritizes the movement so as to minimize vehicle maneuvers, in accordance with instructions provided via a processor.

In various embodiments, a determination is made as to whether the vehicle has encountered an indeterminate route decision (step 208). In various embodiments, a processor (such as the processor 38 of the vehicle 12 and/or a processor of the servers 54 of FIG. 1) makes this determination, using the location and map data from step 204, as to whether the vehicle 12 is faced with a choice of multiple possible directions and/or places of travel, without a clear preferred choice. For example, such an indeterminate route decision may comprise a situation in which there is an upcoming intersection or t-junction, and/or in which a current lane merges or branches off into multiple different lanes, and so on. In various embodiments, such determinations of step 208 are repeated continuously throughout the process 200 during the automatic movement of the vehicle.

In various embodiments, if it is determined at step 208 that the vehicle has not encountered an indeterminate route decision, the process proceeds to step 210. During step 210, automatic movement of the vehicle continues. Specifically, in various embodiments, a processor (such as the processor 38 of the vehicle 12 and/or a processor of the servers 54 of FIG. 1) continues to control automatic movement of the vehicle 12 of FIG. 1, by continuing the actions of step 206 along the current continuous path. In various embodiments, the process 200 also proceeds to step 212 for a determination as to whether the process 200 is to continue, as described in greater detail further below.

Conversely, in various embodiments, if it is instead determined at step 208 that the vehicle has encountered an indeterminate route decision, the process proceeds instead to step 214. During step 214, a determination is made as to whether a confidence level is satisfied for a particular preference for the indeterminate route decision.

In various embodiments, the particular preference is obtained during step 216, for use in the determination of step 214. In various embodiments, during step 216, a processor (such as the processor 38 of the vehicle 12 and/or a processor of the servers 54 of FIG. 1) retrieves preference data (e.g., preference data 85 stored in the memory 40 of FIG. 1, and/or stored in memory of the servers 54 of FIG. 1) as to preferences of the driver 13 (and/or in certain embodiments, as to other drivers of other vehicles 90 of FIG. 1) with respect to the indeterminate route decision. In certain embodiments, these driver preferences are previously obtained and/or updated during a prior iteration of steps 226-228, described in greater detail further below.

With reference back to step 214, in various embodiments, the confidence level is deemed to be satisfied when the user preferences (and/or in certain embodiments, other data as to typical vehicle movement in this location for various vehicles) provide a level of confidence or probability for a particular solution that exceeds a predetermined threshold with respect to certainty that the driver would be deemed to prefer a certain one of possible solutions (e.g., a particular vehicle path or maneuver) for the indeterminate route decision. In certain embodiments, the confidence level is deemed to be satisfied when an iterative confidence counter is satisfied for a particular driver preference for a particular solution (e.g., a particular path or maneuver) pertaining to the indeterminate route decision.

In various embodiments, if it is determined during step 214 that the confidence level is satisfied for a particular solution, then the particular solution is implemented (step 218). Specifically, in various embodiments, the particular solution that is deemed to be preferred is implemented in accordance with instructions provided by a processor (such as the processor 38 of the vehicle 12 and/or a processor of the servers 54 of FIG. 1), and is utilized for the further movement of the vehicle 12 along a continuous path that is defined by the solution. In certain embodiment, the solution comprises a lane of travel. In certain embodiments, the solution may also comprise one or more vehicle maneuvers (e.g., including steering, acceleration, deceleration, and so on). In various embodiments, the process then returns to step 204 for continued inputs, for example in a new iteration.

Conversely, in various embodiments, if it is instead determined during step 214 that the confidence level is not satisfied for any particular solution, then the process instead proceeds to step 220. In various embodiments, during step 220, a determination is made as to whether the driver has provided a preemptive input. Specifically, in various embodiments, a processor (such as the processor 38 of the vehicle 12 and/or a processor of the servers 54 of FIG. 1) determines whether the driver 13 of the vehicle 12 has preemptively provided a driver input as to a driver's preference for a preferred solution with respect to the interminable decision. For example, in various embodiments, the driver may preemptively provide an input as the vehicle 12 approaches the location pertaining to the indeterminable decision, before being prompted by the control system 11, such as by engaging a turn signal, touch screen, knob, button, or dial, or speaking into a microphone, or the like, in a manner that is detected by one or more input sensors 21 with respect to a pre-emptive preference for the driver (e.g., as to a preferred lane for the vehicle 12 to follow, or the like).

If it is determined during step 220 that the driver has provided a preemptive input, then a solution corresponding to the preemptive input is automatically implemented by the vehicle 12, and the process proceeds to the above-described step 218 to implement that solution (e.g., a particular lane to follow, or the like), and is utilized for the further movement of the vehicle 12 along a continuous path that is defined by the solution. In various embodiments, the process then returns to step 204 for continued inputs, for example in a new iteration.

Conversely, if it is instead determined during step 220 that the driver has not provided a preemptive input, then the process proceeds instead to step 222. In various embodiments, during step 222, a determination is made as to whether a driver notification is warranted. Specifically, in various embodiments, during step 222, a processor (such as the processor 38 of the vehicle 12 and/or a processor of the servers 54 of FIG. 1) determines whether the vehicle 12 is sufficiently close to a position requiring the indeterminate decision (such as intersection, splitting of lanes, ending of lanes, or the like) so as to require driver input. In various embodiments, this may be determined as whether the vehicle 12 is currently within a predetermined distance and/or time of reaching this position.

In various embodiments, if it is determined during step 222 that the driver notification is not warranted, then the process returns to step 220. In an exemplary embodiments, steps 220-222 thereafter repeat in new iterations until a determination is made in an iteration of step 222 that a driver notification is warranted.

Once it is determined during step 222 that a driver notification is warranted, a notification is provided to the driver (step 224). In various embodiments, a notification is provided to the driver as to whether the driver has any particular preferences for a solution for the indeterminable decision (e.g., as to whether the driver has a preferred lane or path to follow, and/or a particular vehicle maneuver, and so on). In various embodiments, the notification is provided to the driver 13 of FIG. 1 via instructions provided by a processor (such as the processor 38 of the vehicle 12 and/or a processor of the servers 54 of FIG. 1) to the display 67 and/or speaker 28 of the vehicle 12 of FIG. 1, and/or in certain embodiments, to the electronic device 15 of the driver 13. In various embodiments, the driver's inputs are then received via the input sensors 21 of FIG. 1.

In various embodiments, a determination is made as to whether the driver has provided an adequate response (step 226). Specifically, in various embodiments, a determination is made as to whether the driver has provided a preference for a solution for the indeterminable decision within a predetermined proximity (e.g., a predetermined distance and/or time) of the location pertaining to the indeterminable decision. In various embodiments, this determination is made by a processor (such as the processor 38 of the vehicle 12 and/or a processor of the servers 54 of FIG. 1).

In various embodiments, if it is determined during step 226 that the driver has provided an adequate response (e.g., by providing a preference for a solution within the predetermined proximity of the location), then the process adopts the solution per the driver's preference expressed in the driver inputs of steps 224-226. Specifically, in various embodiments, the process 200 proceeds to step 218, as the driver's preferred solution is implemented via automatic vehicle control. In various embodiments, a processor (such as the processor 38 of the vehicle 12 and/or a processor of the servers 54 of FIG. 1) provides instructions for the vehicle 12 to follow a particular path (e.g., by following a particular lane and/or taking a particular vehicle maneuver) consistent with the driver's preferred solution, and is utilized for the further movement of the vehicle 12 along a continuous path that is defined by the solution, in step 218.

Also in various embodiments, the driver preferences are updated (step 228). In various embodiments, a processor (such as the processor 38 of the vehicle 12 and/or a processor of the servers 54 of FIG. 1) provides instructions for the preference data 85 of FIG. 1 to be updated to reflect the driver preferences and inputs of steps 224-226, and the updated preference data 85 is re-stored in memory (such as the memory 40 of FIG. 1). In certain embodiments, the updated preference data 85 may also be stored in memory of the remote server 18 of FIG. 1, for example in one or more of the databases 56 thereof. In various embodiments, the updated user preference are also utilized in any subsequent iterations of steps 216 as reflected updated user preferences.

Conversely, in various embodiments, if it is instead determined during step 226 that the driver has not provided an adequate response (e.g., by not providing a preference for a solution within the predetermined proximity of the location), then the process instead proceeds to step 230. In various embodiments, during step 226, control is returned to the driver. Specifically, in various embodiments, during step 226, a processor (such as the processor 38 of the vehicle 12 and/or a processor of the servers 54 of FIG. 1) returns driving control to the driver 13 of FIG. 1 for movement of the vehicle 12 (e.g., by the driver 13's use of a steering wheel, brake pedal, accelerator pedal, and so on thereof), rather than via automatic control via the control system 11. In various embodiments, the process 200 also proceeds to step 212 for a determination as to whether the process 200 is to continue, as described in greater detail further below.

In various embodiments, during step 212 (e.g., following steps 210 and/or 230), a determination is made as to whether the process is complete. In various embodiments, this determination is made by a processor (such as the processor 38 of the vehicle 12 and/or a processor of the servers 54 of FIG. 1) as to whether the current vehicle drive (or ignition cycle) is finished. In certain other embodiments, this determination is made by the processor as to whether the driver's current engagement or selection of autonomous vehicle control is finished. In certain embodiments, this determination is made throughout the process 200.

In various embodiments, if it is determined during step 212 that the process is not complete, then the process returns to step 204 in a new iteration. Otherwise, in various embodiments, if it is determined during step 212 that the process is not complete, the process terminates at step 240.

Accordingly, in various embodiments, methods and systems are provided for determining and implementing a continuous driving path in the absence of a navigational route for a vehicle with autonomous functionality. In various embodiments, driver inputs are obtained and used for learning and updating of preferences for selecting paths of travel for a vehicle when decisions would otherwise be indeterminable (e.g., when there is an upcoming intersection or t-junction, and/or in which a current lane merges or branches off into multiple different lanes, and so on).

It will be appreciated that the systems and methods may vary from those depicted in the Figures and described herein. For example, the communications system 10 of FIG. 1, including the vehicle 12 thereof and components thereof, may vary from that depicted in FIG. 1 and/or described herein, in various embodiments. It will similarly be appreciated that the process of FIG. 2 may differ from those described herein and/or depicted in FIG. 2, and/or that steps thereof may be performed simultaneously and/or in a different order as described herein and/or depicted in FIG. 2, among other possible variations.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof.

What is claimed is:

1. A method for determining a continuous driving path for a vehicle, the method comprising:
- automatically controlling movement of the vehicle along a path in accordance with instructions provided via a processor;
- obtaining data comprising location information as to a location of the vehicle and map information pertaining to the location as the vehicle is travelling autonomously in accordance with instructions provided by the processor;
- determining, via the processor, when the vehicle has encountered an indeterminate route decision with respect to further travel of the vehicle, based on the location information and the map information, specifically, when the vehicle is approaching an intersection or when a current lane of travel of the vehicle is splitting into multiple lanes or is ending;
- determining, via the processor, a confidence level associated with a solution to the decision, wherein the solution comprises a particular path or maneuver for the vehicle;
- when the confidence level is met, determining the continuous driving path without input from a driver and automatically controlling the vehicle to automatically implement the continuous driving path by movement of the vehicle along the continuous driving path and perform the solution in accordance with instructions provided by the processor to a powertrain, a braking system, and a steering system of the vehicle; and
- when the confidence level is not met:
  - determining via the processor whether the driver has provided pre-emptive input for the solution;
  - when the driver has provided pre-emptive input, then automatically controlling the vehicle to automatically implement the continuous driving path by movement of the vehicle along the continuous driving path and perform the solution based on the pre-emptive input accordance with instructions provided by the processor to the powertrain, the braking system, and the steering system of the vehicle;
  - when the driver has not provided pre-emptive input, determining whether driver notification is required based on whether the vehicle is less than a predetermined time or distance from the intersection, the current lane of travel splitting into multiple lanes, or the current lane of travel ending;
  - when it is determined that the driver notification is required, requesting, via instructions provided by the processor, driver responsive input as to a driver request made by the driver for movement of the vehicle with regard to the decision;
  - receiving, via one or more sensors, the driver responsive input including the driver request; and
  - when the driver responsive input is received within a predetermined amount of time, then determining, via the processor, the continuous driving path based on the driver responsive input, and automatically controlling the vehicle to automatically implement the continuous driving path by movement of the vehicle along the continuous driving path and perform the solution based on the driver responsive input accordance with instructions provided by the processor to the powertrain, the braking system, and the steering system of the vehicle; and
  - when the driver responsive input is not received with the predetermined amount of time, then returning control of the vehicle to the driver of the vehicle.

2. The method of claim 1, wherein the step of receiving the driver responsive input comprises receiving, via the one or more sensors, the driver responsive input from a turn indicator of the vehicle.

3. The method of claim 1, further comprising:
- storing the driver responsive input for autonomous movement of the vehicle and for autonomous movement of one or more other vehicles.

4. A system for determining a continuous driving path for a vehicle, the system comprising:
- a processor configured to:
  - automatically control movement of the vehicle along a path;
  - obtain data comprising location information as to a location of the vehicle and map information pertaining to the location as the vehicle is travelling autonomously in accordance with instructions provided by the processor;
  - determine when the vehicle has encountered an indeterminate route decision with respect to further travel of the vehicle, based on the location information and the map information, specifically, when the vehicle is approaching an intersection or when a current lane of travel of the vehicle is splitting into multiple lanes or is ending;
  - determine a confidence level associated with a solution to the decision, wherein the solution comprises a particular path or maneuver for the vehicle;
  - when the confidence level is met, determine the continuous driving path without input from a driver and automatically control the vehicle to automatically implement the continuous driving path by movement of the vehicle along the continuous driving path and perform the solution in accordance with instructions provided by the processor to a powertrain, a braking system, and a steering system of the vehicle; and
  - when the confidence level is not met:
    - determine whether the driver has provided pre-emptive input for the solution;
    - when the driver has provided pre-emptive input, then automatically control the vehicle to automatically implement the continuous driving path by movement of the vehicle along the continuous driving path and perform the solution based on the pre-emptive input accordance with instructions provided by the processor to the powertrain, the braking system, and the steering system of the vehicle;
    - when the driver has not provided pre-emptive input, determine whether driver notification is required based on whether the vehicle is less than a predetermined time or distance from the intersection, the current lane of travel splitting into multiple lanes, or the current lane of travel ending;
    - when it is determined that the driver notification is required, request driver the driver including a driver request made by the driver as to a responsive input from requested movement of the vehicle with regard to the decision;
    - when the driver responsive input is received within a predetermined amount of time, then determine the continuous driving path based on the driver responsive input, and automatically control the vehicle to automatically implement the continuous driving path by movement of the vehicle along the continuous driving path and perform the solution based on the driver responsive input accordance with instructions provided by the processor to the powertrain, the braking system, and the steering system of the vehicle; and when the driver responsive input is not received with the predetermined amount of time, then return control of the vehicle to the driver of the vehicle; and one or more sensors coupled to the processor and configured to receive the driver responsive input including the driver request.

5. The system of claim 4, wherein the one or more sensors are further configured to receive the driver responsive input from a turn indicator of the vehicle.

6. The system of claim 4, wherein the processor is further configured to store the driver responsive input in computer memory for autonomous movement of the vehicle.

7. The system of claim 4, wherein the processor is further configured to store the driver responsive input for autonomous movement of one or more other vehicles.

8. The system of claim 4, wherein the processor is configured to determine when the vehicle has encountered an indeterminate route decision with respect to further travel of the vehicle based on when the vehicle is approaching an intersection.

9. The system of claim 4, wherein the processor is configured to determine when the vehicle has encountered an indeterminate route decision with respect to further travel of the vehicle based on when a current lane of travel of the vehicle is splitting into multiple lanes.

10. The system of claim 4, wherein the processor is configured to determine when the vehicle has encountered an indeterminate route decision with respect to further travel of the vehicle based on when a current lane of travel of the vehicle is ending.

11. A vehicle comprising:
a body;
a satellite-based GPS location system configured to generate location information as to a location of the vehicle;
a computer memory configured to store map information as to the location;
a powertrain;
a braking system;
a steering system;
a processor configured to:
automatically control movement of the vehicle along a path in accordance with instructions provided via the processor to the powertrain, the braking system, and the steering system;
determine when the vehicle has encountered an indeterminate route decision with respect to further travel of the vehicle, based on the location information and the map information, specifically, when the vehicle is approaching an intersection or when a current lane of travel of the vehicle is splitting into multiple lanes or is ending;
determine a confidence level associated with a solution to the decision, wherein the solution comprises a particular path or maneuver for the vehicle;
when the confidence level is met, determine the continuous driving path without input from a driver and automatically control the vehicle to automatically implement the continuous driving path by movement of the vehicle along the continuous driving path and perform the solution in accordance with instructions provided by the processor to the powertrain, the braking system, and the steering system of the vehicle; and when the confidence level is not met:
determine whether the driver has provided pre-emptive input for the solution;
when the driver has provided pre-emptive input, then automatically control the vehicle to automatically implement the continuous driving path by movement of the vehicle along the continuous driving path and perform the solution based on the pre-emptive input accordance with instructions provided by the processor to the powertrain, the braking system, and the steering system of the vehicle;
when the driver has not provided pre-emptive input, determine whether driver notification is required based on whether the vehicle is less than a predetermined time or distance from the intersection, the current lane of travel splitting into multiple lanes, or the current lane of travel ending;
when it is determined that the driver notification is required, request driver responsive input from the driver including a driver request made by the driver as to a requested movement of the vehicle with regard to the decision;
when the driver responsive input is received within a predetermined amount of time, then determine the continuous driving path based on the driver responsive input, and automatically control the vehicle to automatically implement the continuous driving path by movement of the vehicle along the continuous driving path and perform the solution based on the driver responsive input accordance with instructions provided by the processor to the powertrain, the braking system, and the steering system of the vehicle; and
when the driver responsive input is not received with the predetermined amount of time, then return control of the vehicle to the driver of the vehicle; and
one or more sensors coupled to the processor and configured to receive the driver responsive input including the driver request.

12. The vehicle of claim 11, wherein the one or more sensors are further configured to receive the driver responsive input from a turn indicator of the vehicle.

13. The vehicle of claim 11, wherein the processor is further configured to store the driver responsive input in the computer memory for autonomous movement of the vehicle and for further use in autonomous movement of one or more other vehicles.

14. The vehicle of claim 11, wherein the processor is configured to determine when the vehicle has encountered an indeterminate route decision with respect to further travel of the vehicle based on when the vehicle is approaching an intersection.

15. The vehicle of claim 11, wherein the processor is configured to determine when the vehicle has encountered an indeterminate route decision with respect to further travel of the vehicle based on when a current lane of travel of the vehicle is splitting into multiple lanes.

* * * * *